Patented Aug. 2, 1949

2,478,125

UNITED STATES PATENT OFFICE 2,478,125

PREPARATION OF 4-HYDROXYQUINOLINES

Elmore H. Northey and Paul F. Dreisbach, Bound Brook, N. J., assignors to American Cyanamid Company, New York, N. Y., a corporation of Maine No Drawing. Application October 9, 1944, Serial No. 557,935

5 Claims. (Cl. 260—289)

This invention relates to a new method of preparing 4-hydroxyquinolines, particularly those having substituents on the benzene ring, such as 4-hydroxy-7-haloquinoline.

The substituted 4-hydroxyquinolines have recently become of great importance as intermediates in the production of therapeutic agents, particularly anti-malarials. Methods of preparing these compounds are known but, unfortunately, are quite unsatisfactory for the commercial production of large quantities of the substances at reasonable cost. Previously known methods of synthesis of these compounds require expensive intermediates, a multiplicity of reactions and processing steps with relatively low yields and difficult reaction conditions.

One of the principal objects of the present invention, therefore, is to prepare 4-hydroxyquinolines, with or without substituents in the benzene ring, from cheap and readily available intermediates with reasonably good yields at a comparatively low cost. Another object of the invention is to prepare these compounds by a process involving a minimum number of steps using inexpensive intermediates and easily attained reaction conditions. Another object of the present invention is to prepare 4-hydroxy-7-chloroquinoline at a low cost in sufficient quantities to make possible the use of this compound in the preparation of therapeutic agents.

Preparation of substituted 4-hydroxyquinolines by means of the present invention is brought about by heating an N-[2-(carboalkoxy) ethylidine] aniline in a suitable inert reaction medium at temperatures within the range of about 200° to 300° C. whereby an alcohol is split out and ring closure takes place to form a substituted 4-hydroxyquinoline as follows:

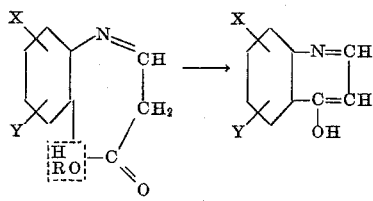

The intermediate N-[2-(carboalkoxy) ethylidine] aniline is easily prepared by heating an aniline or a substituted aniline with formylacetic ester, thereby resulting in the formation of an anil. This reaction may be illustrated by the following equation:

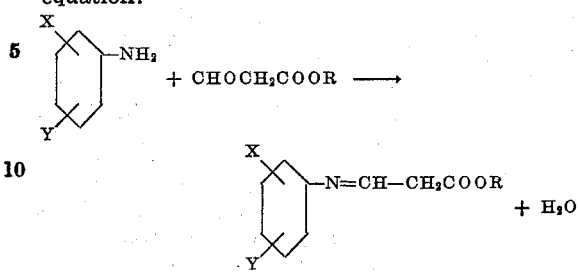

In these formulae X and Y may be any substituents such as hydrogen, halogen (Cl, Br, etc.), alkyl ($CH_3$—, $C_2H_5$—, etc.), or alkoxy ($CH_3O$—, $C_2H_5O$—) radicals, and R may be any short chain alkyl radical such as methyl, ethyl, tertiary-butyl, or the like. The formation of anils of the type used are well known reactions.

Ring closure of the anil is most conveniently conducted with the anil suspended or dissolved in a suitable vehicle such as diphenyl ether, biphenyl, mineral oil, mixtures of these or the like. The vehicle should be relatively stable to withstand the temperatures of the reaction and should have a high boiling point, preferably above 300° C., so that the reaction may be conducted at atmospheric pressure. When lower boiling solvents are used the use of pressure vessels is necessitated. The solvent, or vehicle, should also be free from reactive groups such as hydroxy groups, ester groups, and the like, which might react with the intermediate or final reaction product and decompose at the reaction temperature.

The concentration of the anil in the reaction media is important in obtaining good yields of the final product. Ordinarily we use from about 5 to 50 parts, preferably 8 to 16 parts, by weight of solvent for each part by weight of the anil.

The temperature at which we heat the anil to bring about ring closure is usually within the range of 200° to 300° C. At these high temperatures the reaction takes place very rapidly and is completed within a period of about fifteen seconds to fifteen minutes, depending upon the temperature and concentration of the anil. Heating the reaction mixture at high temperatures for a longer period of time is to be avoided since we have found that thermal decomposition products are formed which lower the yield and which result in the presence of tar-like substances in the reaction mixture making the isolation of the product more difficult.

Because of the simplicity and rapidity of the reaction it lends itself to continuous operation; for example, the anil dissolved in a suitable solvent may be passed through heated pipes at the temperatures and for the times specified above. The product may be continuously removed, cooled, and the 4-hydroxyquinoline recovered therefrom by crystallization and filtration.

The invention will now be illustrated in greater detail by means of the following examples in which a representative anil, N-[2-(carboalkoxy) ethylidine] m-chloroaniline is converted into 4-hydroxy-7-chloroquinoline by the process just described. It will be understood, of course, that the reaction conditions may be varied within the ranges just described without departing from the essential features of novelty. All parts are by weight unless otherwise specified.

Example 1

Eighty parts by volume of industrial diphenyl ether was heated to approximately 246° C. Five parts by weight of N-[2-(carbomethoxy) ethylidine]-m-chloroaniline prepared by condensation of m-chloroaniline with sodium formylacetic ester was added with agitation and the mixture was stirred and heated at the boiling point of the diphenyl ether for eight minutes. The clear brownish colored solution was then cooled over a period of 10–30 minutes to 28° C. during which time a precipitate formed (from about 120° C. downward). This solid product was then filtered giving 1.9 parts of a crude material.

The crude product was extracted with 250 parts of boiling water, the insoluble material was filtered and upon cooling the filtrate a white crystalline precipitate formed. The solution was further cooled in an ice-bath and then filtered to yield a white crystalline product melting at 269–273° C. The aqueous mother liquor contained a small additional amount of material. The crystalline product was identified as 4-hydroxy-7-chloroquinoline by comparison with a known sample of the latter prepared by a different method. The melting point of a mixture of the two showed no depression.

Example 2

Forty parts by volume of U. S. P. mineral oil was heated to 295–300° C. Four parts by weight of N-[2(carbomethoxy) ethylidine]-m-chloroaniline was heated to 100° C. and then added rapidly to the hot mineral oil. After heating at 294–298° C. for three minutes from the time of addition of the first portion of the ester, the mixture, which had turned a dark brown color, was quickly cooled to room temperature.

After further cooling in an ice-bath, the mineral oil was decanted from the precipitated gummy material. The residue was extracted with dilute hydrochloric acid (2 to 3 N) until all the acid soluble material had been removed. Decreasing the acidity of the acid solution to pH 3.5 (approximately) caused the precipitation of small amounts of by-products which were removed by filtration. Upon addition of sodium carbonate in excess to the acid solution a white solid material precipitated which was filtered. This was dissolved in 80 parts of boiling water. After filtration to remove insoluble material and cooling of the filtrate a white crystalline material separated from the solution. This material was identified as 4-hydroxy-7-chloroquinoline having a melting point of 272–274° C. and showing no depression in melting point when mixed with a sample of known 4-hydroxy-7-chloroquinoline prepared by a more laborious method.

Example 3

One part N-[2(carbomethoxy) ethylidine] aniline was dissolved in 3 parts Dowtherm A (an eutectic mixture of biphenyl and diphenyl ether) at 120° C. This solution was added to 13 parts Dowtherm A at its boiling temperature (245°). After a short heating period (8 min.), the mixture was cooled and a black substance which formed was filtered. This was extracted with hot water and the extract was evaporated to dryness. The residue of crude 4-hydroxyquinoline was then recrystallized from octyl alcohol. The product did not depress the melting point when mixed with an authentic sample of 4-hydroxyquinoline.

By hot water extraction of the Dowtherm mother liquor a further small yield of 4-hydroxyquinoline was obtained.

We claim:

1. A process of preparing 4-hydroxyquinolines of the formula:

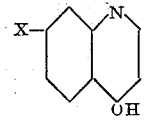

in which X is a member of the group consisting of hydrogen, halogen, short chain alkyl and short chain alkoxy radicals, which comprises heating in an inert liquid an anil of the formula

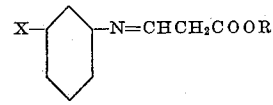

in which R is an alkyl radical, until ring closure takes place.

2. A process of preparing 4-hydroxyquinolines of the formula

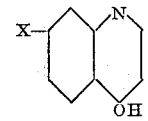

in which X is a member of the group consisting of hydrogen, halogen, short chain alkyl and short chain alkoxy radicals, which comprises heating an anil of the formula

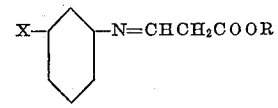

in which R is an alkyl radical, in an inert liquid at a temperature within the range 200° to 300° C. until ring closure takes place.

3. A method of preparing 4-hydroxy-7-haloquinolines which comprises heating an N[-2(carboalkoxy) ethylidine]m-haloaniline in an inert solvent at a temperature within the range 200° to 300° C. until a 4-hydroxy-7-haloquinoline is formed.

4. A method of preparing 4-hydroxy-7-chloroquinoline which comprises heating an N[2(carboalkoxy)ethylidine]m-chloroaniline in 5 to 50 parts by weight of an inert solvent at a temperature within the range 200° to 300° C. until 4-hydroxy-7-chloroquinoline is formed.

5. A method of preparing 4-hydroxy-7-chloroquinoline which comprises heating an N[2(carbomethoxy)ethylidine]m-chloroaniline in 5 to 50 parts by weight in an inert solvent at a temperature within the range 200° to 300° C. until 4-hydroxy-7-chloroquinoline is formed.

ELMORE H. NORTHEY.
PAUL F. DREISBACH.

REFERENCES CITED

The following references are of record in the file of this patent:

Journal Gen. Chem. (U. S. S. R.), vol. 7, pp. 1885–1895 (1937).

Journal Gen. Chem. (U. S. S. R.), vol. 9, pp. 1517–1524 (1939).